W. G. CLAYTON.
FUEL ECONOMIZING DEVICE FOR INTERNAL COMBUSTION ENGINES.
APPLICATION FILED JUNE 16, 1917.

1,345,432.

Patented July 6, 1920.

Inventor:
William George Clayton
per H. W. Rucker
Attorney.

UNITED STATES PATENT OFFICE.

WILLIAM GEORGE CLAYTON, OF UPPER HAWTHORN, NEAR MELBOURNE, VICTORIA, AUSTRAL:

FUEL-ECONOMIZING DEVICE FOR INTERNAL-COMBUSTION ENGINES.

1,345,432.   Specification of Letters Patent.   Patented July 6, 1920.

Application filed June 16, 1917. Serial No. 175,231.

*To all whom it may concern:*

Be it known that I, WILLIAM GEORGE CLAYTON, a citizen of the Commonwealth of Australia, and resident of Upper Hawthorn, near Melbourne, in the State of Victoria and said Commonwealth of Australia, have invented a certain new and useful Fuel-Economizing Device for Internal-Combustion Engines, of which the following is a specification.

This invention relates to a device for attachment to internal combustion engines whereby the fuel is economized and the starting of the engine is facilitated.

An essential feature embodied in this invention consists in the particular arrangement whereby hot or cold air forming a secondary or extra air supply is fed as required to the cylinder or cylinders of the engine.

A further essential feature consists in the use of a chemical strainer or filter for purifying and adding an explosive substance to the secondary air supply before it reaches the cylinder or cylinders.

In order that the invention may be more readily understood it will now be described with reference to the accompanying drawings, wherein—

Figure 1:
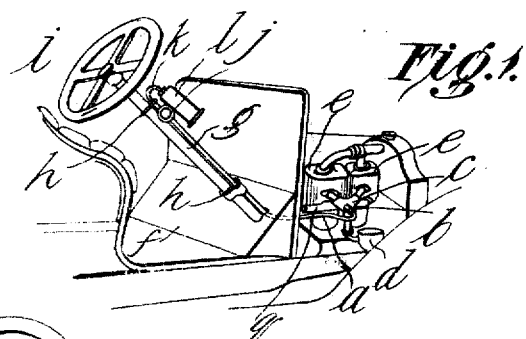
Figure 1 is a view in perspective illustrating the invention applied to the engine of an automobile.
Figure 2:
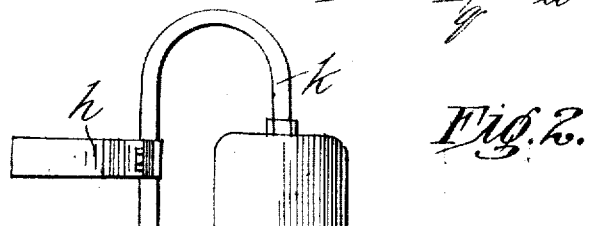
Fig. 2 is a view in side elevation of the improved device.
Figure 3:
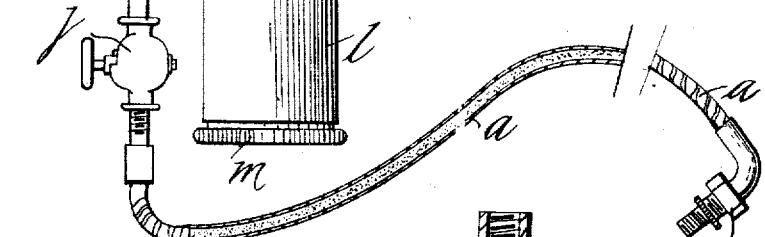
Fig. 3 is a view in vertical central section of the improved air purifying strainer or filter, and—
Figure 4:
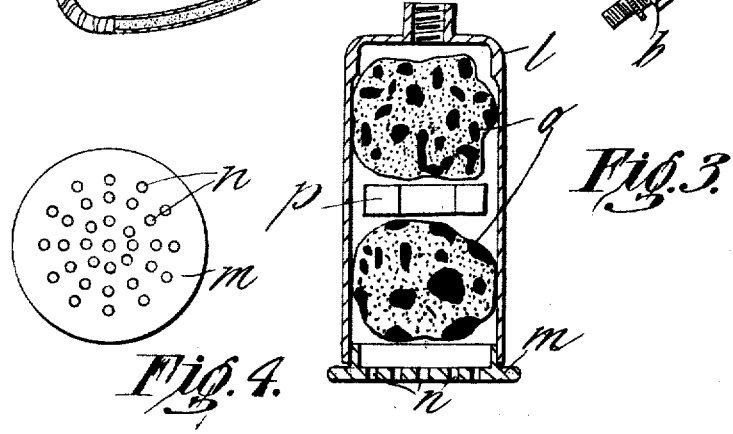
Fig. 4 is a view in plan of the underside of the filter shown in Fig. 3 and illustrating the air inlets.

The invention is directed to the provision of means for the supply or interchange of hot or cold chemically purified air to the engine cylinders to act as a secondary or additional source of air supply to the standardized carbureter feed.

According to this invention a flexible metal tube $a$ of the required length is attached at one end by a suitable union or joint $b$ to the induction pipe $c$ between the carbureter $d$ and the cylinders $e$.

This flexible pipe $a$ extends from the induction pipe $c$ to a position most convenient for operation and control, being preferably passed through the foot plate $f$ and along the steering pillar $g$ to which it is fastened by clips or other fastening devices $h$.

Adjacent the steering wheel $i$ the tube $a$ is fitted with a control valve $j$ which connects the pipe bend $k$ to which is detachably connected a cylinder or container $l$ the outer end of which is preferably fitted with a detachable end or cap $m$ formed with one or a plurality of air holes $n$.

Within the cylinder $l$ a sponge is fitted, preferably two pieces $o$ being employed, and a solid piece or pieces of chemical $p$ is also inserted, the chemical employed being camphor, saltpeter or other suitable air purifying agent or chemicals containing explosive matter or substances may be used, if desired.

The tube $a$ is preferably lined with asbestos or other suitable heat resisting material.

In operation, and when the engine is running, the suction in the carbureter $d$ is broken to some extent as the tube $a$ is in direct communication with the atmosphere. A part of the suction from the cylinders $e$ is therefore concentrated through the tube $a$ the supply of air being controlled by the valve $j$.

The chemical $p$ in the cylinder $l$ purifies the air which is drawn past it by the suction created by the engine and the sponges $o$ act as a silencer and deaden the noise of the air as it is drawn through the pipe $a$, the sponges also serving the additional function of air filters or strainers.

When it is desired to supply hot air to the cylinders the tube $a$, adjacent the exhaust pipe $q$, is laid against or alongside it, so heating the air as it passes through the said tube $a$, which tube can readily be removed from the exhaust pipe should cold air be required.

By the use of a device for supplying extra hot or cold air to the engine cylinders, than that ordinarily supplied through the carbureter, the cost of running an internal combustion engine is decreased to a considerable extent as more air and less fuel may be used without decreasing the power of the engine, and the further advantage is gained by the method herein described as the secondary or extra air supply is caused to travel some distance, is purified or chemically treated, and is effectively controlled thus giving the improved results above described.

It will be readily understood that if the chemical used is capable of giving off explosive gases or substances the air fed through the device is enriched and consequently greater power will be obtained.

What I do claim as my invention and desire to secure by Letters Patent is—

A fuel economizing device for internal combustion engines comprising a container, a detachable perforated cap thereon, sponges in said container, a body between said sponges adapted to increase the flash when mixed with the explosive charge at the time of ignition, a flexible pipe having one end in communication with said container and adapted to be connected at its other end to the engine manifold, a valve between said container and said pipe, the intermediate portion of said pipe being adapted to be alongside the exhaust pipe of the engine.

Signed at Melbourne, in the State of Victoria and Commonwealth of Australia, this 30th day of April, A. D. 1917.

WILLIAM GEORGE CLAYTON.

Witnesses:
A. EDWARDS,
SIDNEY HENDLEY.